3,088,790
DYEINGS AND PRINTS POSSESSING FASTNESS TO WET PROCESSING AND THEIR MANUFACTURE ON CELLULOSE MATERIAL
Werner Schultheis, Konigstein, Taunus, Kurt Schimmelschmidt, Frankfurt am Main, Hermann Hofmann, Bad Soden, Taunus, Edwin Baier, Frankfurt am Main, and Albert Bode, Schwalbach, Taunus, Germany, assignors to Farbwerke Hoechst Aktiengesellschaft vormals Meister Lucius & Brüning, Frankfurt am Main, Germany, a corporation of Germany
No Drawing. Filed Apr. 19, 1960, Ser. No. 23,139
Claims priority, application Germany Apr. 30, 1959
9 Claims. (Cl. 8—54.2)

It is shown to use compounds of sulfur dyestuffs and alkali metal sulfites for dyeing and printing cotton in the presence of alkalies or alkali sulfides (German Patents 88,392, 91,720 and 94,501) or in the absence of alkalies and reducing agents at elevated temperatures (German Patent 1,004,586). It is supposed that the compounds in question represent sulfur dyestuffs containing thiosulfuric acid groups.

Now we have found that dyeings and prints of a very good fastness to wet processing are obtained on structures such as fibers, filaments, flakes, fabrics, knitted fabrics and foils of native or regenerated cellulose with the use of any desired water-soluble organic dyestuff containing one or more thiosulfuric acid groups, except sulfur dyestuffs, if the cellulose materials dyed, padded or printed with these dyestuffs are treated with alkalies or alkaline reducing agents during or after the application of the dyestuffs.

The dyeings and prints so prepared are superior to those prepared with the known compounds of sulfur dyestuffs and alkali sulfites both as regards the properties of fastness to wet processing (this is particularly true of the dyestuffs to be used according to the process of the invention which, in addition to thiosulfuric acid groups, do not contain further groups imparting solubility in water) and brilliancy.

The water-soluble dyestuffs containing thiosulfuric acid groups, which are suitable for use in the process of the present invention, may, for example, belong to the azo, anthraquinone, vat, acridone, phenazine, dioxazine, diphenyl-methane, triphenyl-methane, nitro or phthalocyanine series. The thiosulfuric acid groups may be directly bound to the aromatic nuclei of the basic dyestuff molecules or via bridge members of aliphatic or hydrocarbon radicals which may be substituted, if desired, and interrupted by hetero atoms. If desired, the dyestuffs may contain, in addition to thiosulfuric acid groups, further groups imparting solubility in water, such, for example, as sulfonic or carboxylic acid groups. They may be prepared, for example, by coupling diazotized aromatic amines containing thiosulfuric acid groups with any desired coupling components which, on their part, may contain thiosulfuric acid groups, or by condensing reactive halogen derivatives of dyestuffs with aliphatic or aromatic amines containing thiosulfuric acid groups.

In case the water-soluble dyestuffs containing thiosulfuric acid groups possess substantive properties, they can be dyed from the dyeing bath on cellulose materials, at a long goods-to-liquor ratio. In order to produce dyeings having a good fastness to wet processing, there may be added to the dyeing bath, during the dyeing process already, alkalies such as sodium carbonate or tri-sodium phosphate, or alkaline reducing agents such as sodium sulfide or sodium cyanide, or the dyeings may be aftertreated with alkalies or alkaline reducing agents.

The after-treatment with alkalies or alkaline reducing agents is carried out in an aqueous medium, depending on the nature of the dyestuff used and the method of its application, generally in the hot, or furthermore, by steaming or thermofixation. The treatment in an aqueous medium may be carried out on the jigger, winch vat or roller vat at a temperature within the range of about 40° C. and 95° C. If there are applied relatively high concentrations of alkalies or alkaline reducing agents, the fixation of the dyestuffs in an aqueous medium may already be carried out in the cold, for example at room temperature. It is suitable to add to the developing bath so much of sodium chloride (about 100 g. to 300 g. per liter) that a bleeding of the dyestuffs in the developing bath is completely or almost completely avoided. The aftertreatment by steaming is then carried out on the MatherPlatt ager, on the continuous steamer at a temperature within the range of about 103° C. to about 105° C. or in the star steamer at a temperature within the range of about 110° C. to 115° C.

The thermofixation may, for example, be carried out on the straining frame at a temperature within the range of about 130° C. to 140° C.

Depending on the nature of the dyestuff used and its application, the concentration of alkalies or alkaline reducing agents in the dyeing or after-treating bath may vary between 2 g. and 50 g. per liter. In this connection it is noted that the method, for example, can also be modified to the effect that the fabric is first padded with a solution of alkali or alkaline reducing agent having a concentration within the range as specified above for the after-treating bath and, after intermediate drying, the dyestuff solution is padded or the printing ink is printed and, after repeated intermediate drying, the material is steamed. The various possibilities of carrying out the process are illustrated in the examples.

In case of dyestuffs possessing molecule constituents which are sensitive to alkali or alkaline reducing agents, such as, for example, azo-dyestuffs, the conditions of application and after-treatment are to be adjusted in a manner such that the color yielding system of the dyestuffs is not impaired during fixation.

In comparison with comparable dyeings and prints prepared with dyestuffs containing sulfonic acid groups instead of thiosulfuric acid groups which are directly bound, or via bridge members, to the aromatic nuclei of the dyestuff molecules, the dyeings and prints prepared according to the process of the present invention are distinguished by substantially better properties of fastness to wet processing. Thus, for example, the dyeings prepared according to the invention with the dyestuff of the following formula

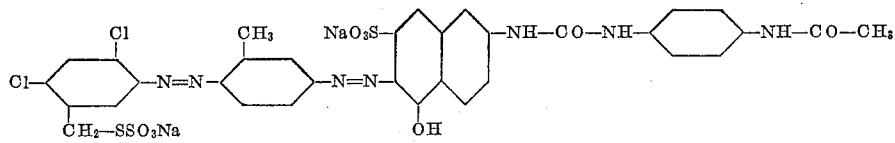

are considerably superior to the dyeings prepared with the comparable dyestuff of the following formula

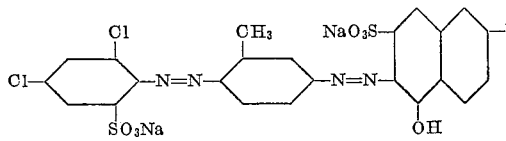 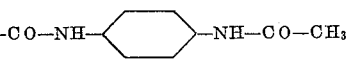

as regards their properties of fastness to wet processing and washing. The superiority in the said properties of fastness becomes also evident, for example, when comparing the dyeings prepared with copper-phthalocyanine-sulfonic acid and the condensation products of copper-phthalocyanine sulfochlorides with 2-amino-ethyl-thiosulfuric acid, and furthermore, with the coupling products of diazotized metanilic acid or 3-amino-benzyl-thiosulfuric acid with the condensation products of nickel-phthalocyanine-sulfochlorides with amino-phenyl-methyl-pyrazolones (Deutsche Auslegeschrift 1,044,309).

According to the present process, dyeings and prints of optimum fastness to wet processing are obtained if the water-soluble dyestuffs contain two or more thiosulfuric acid groups and no further groups imparting solubility in water such as, for example, sulfonic acid or carboxylic acid groups.

The following examples serve to illustrate the invention but they are not intended to limit it thereto; the parts being by weight unless otherwise stated and the relationship of parts by weight to parts by volume being the same as that of the kilogram to the liter.

*Example 1*

10 parts of cotton are introduced in the cold into a dyeing bath containing 2 parts of sodium carbonate, 0.2 part of the dyestuff corresponding to the following formula

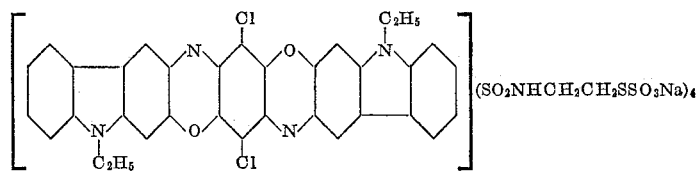

and 300 parts of water. The bath is heated to 95° C. within 30 minutes and the material is dyed at this temperature for one hour. The material is then rinsed cold, acidified if necessary, soaped at the boil, rinsed again and dried. There is obtained a blue dyeing of a good fastness to wet processing.

The dyestuff used is prepared by condensing the corresponding dioxazine-sulfochloride with 2-amino-ethyl-thiosulfuric acid.

*Example 2*

10 parts of cotton are dyed for 1 hour at a temperature within the range of 85° C. to 90° C. in a dyeing bath consisting of 0.2 part of sodium sulfate, 300 parts of water and 0.2 part of a dyestuff which is obtained by coupling 2 moles of diazotized 3-amino-benzyl-thiosulfuric acid with 4,4'-di-(acetoacetylamino)-3,3'-dimethyl-diphenyl and corresponds to the following formula

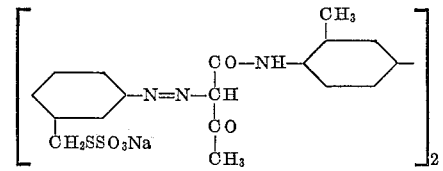

The dyed material is squeezed off or centrifuged and after-treated for 30 minutes at a temperature within the range of 85° C. to 90° C. in a bath containing 5 g. of sodium sulfide and 200 g./l. of sodium chloride. The yellow dyeing obtained is rinsed, soaped at the boil, rinsed again and dried. The fastness to wet processing is very good. Deeper dyeings of the same good fastness to wet processing are obtained if sodium carbonate is used instead of sodium sulfate.

*Example 3*

20 parts of a cotton fabric are padded on the foulard with 100 parts of a padding solution containing 50 g./l. of a dyestuff which is prepared by coupling 3 moles of diazotized 3-amino-benzyl-thiosulfuric acid with 1 mol of the reaction product of 1 mol nickel-phthalocyanine-trisulfochloride with 3 moles of 1-(4'-amino-phenyl)-3-methyl-pyrazolone-(5). The material is dried at a temperature within the range of 80° C. to 90° C. and treated on the jig for 1 hour at a dyeing bath temperature of 95° C. in 140 parts of a sodium sulfide solution of 0.5% strength containing 200 g./l. of sodium chloride. The material is then rinsed, soaped, rinsed again and dried. There is obtained a green dyeing which possesses a very good fastness to wet processing.

*Example 4*

40 parts of a dyestuff corresponding to the following formula

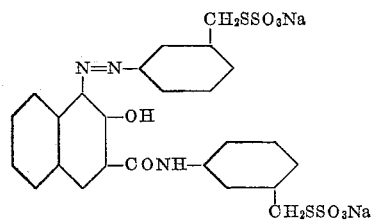

which is obtained by coupling diazotized 3-amino-benzyl-thiosulfuric acid with 3-(2',3'-hydroxy-naphthoylamino)-benzyl-thiosulfuric acid, are dissolved in 1000 parts of water, and 200 parts of a cotton fabric are padded with this solution. The material is dried and then padded again with a sodium sulfide solution of 2% strength, steamed for 10 minutes at 100° C., rinsed, soaped at the boil, rinsed again and dried.

There is obtained a very beautiful scarlet possessing a good fastness to wet processing.

*Example 5*

0.4 part of a dyestuff prepared by condensing 1 mol of copper-phthalocyanine-trisulfochloride with 3 moles of 2-amino-ethyl-thiosulfuric acid is dissolved in 40 parts of hot water. The solution is filled up to obtain 300 parts and charged with 10 parts of cotton. The bath is heated to 60° C., 20 parts of sodium sulfate are added thereto in portions, then heated to a temperature within the range of 80° C. to 90° C. and the material is dyed for 1 hour at this temperature. The material is then squeezed off or centrifuged and aftertreated for 15 to 20 minutes, at a temperature within the range of 70° C. to 80° C., with 100 parts of a sodium sulfide solution of 0.5% strength containing 200 g./l. of sodium chloride. There is obtained a very beautiful turquoise blue which is fast to washing.

*Example 6*

A cotton fabric is dyed according to the padding-jig method described in Example 3 with a dyestuff prepared by condensing copper-phthalocyanine-tetrasulfochloride with 4 moles of 2-amino-ethyl-thiosulfuric acid.

The fixation on the jig, however, is effected by an after-treatment for 10 minutes at room temperature.

Example 7

10 parts of cotton are introduced into 300 parts of a dyestuff solution containing 0.2 part of a red dyestuff corresponding to the following formula

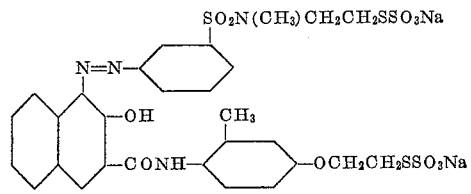

which is prepared by coupling diazotized 3-amino-benzene-sulfonyl-(methyl-amino) - β-ethyl-thiosulfuric acid with 4-(2',3'-hydroxy-naphthoylamino) - 3-methyl-phenoxy-β-ethyl-thiosulfuric acid. The bath is heated to 60° C. and 50 parts of sodium chloride and 0.1 part of sodium sulfide are added thereto. The whole is then heated within 30 minutes to 95° C. and dyeing is continued for 1 hour at this temperature. The material is rinsed, soaped, rinsed again, and dried. There is obtained a red dyeing possessing a very good fastness to wet processing.

Example 8

10 parts of cotton are dyed with the dyestuff corresponding to the following formula

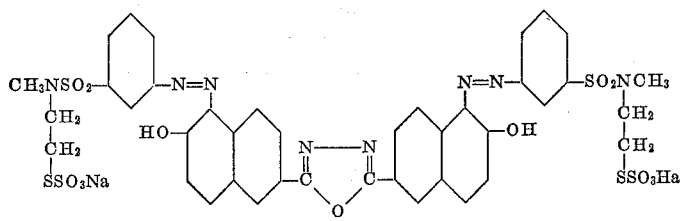

which is obtained by coupling 2 moles of diazotized 3-amino-benzene - sulfonyl-(methyl-amino)-β - ethyl-thiosulfuric acid with 2,5-bis-(6'-hydroxy-naphthyl-2')-oxadiazole-(3,4), according to the dyeing method described in Example 2, but with 20 parts instead of 0.2 part of sodium sulfate. The temperature of the after-treating bath can be reduced to 40° C. to 50° C. The orange dyeing obtained possesses a very good fastness to washing.

Example 9

10 parts of a staple fiber fabric are treated on the jig for 10 to 15 minutes at 80° C. in 60 parts of an aqueous solution of 5% strength of the dyestuff which is prepared by coupling 3 moles of diazotized 3-amino-benzene-sulfonyl-(methyl-amino) - β - ethyl-thiosulfonic acid with the reaction product of nickel-phthalocyanine-trisulfochloride with 3 moles of 1-(4'-amino-phenyl)-3-methyl-pyrazolone-(5). The material is then squeezed off and the dyeing is developed in a fresh bath for 15 minutes at 75° C. in an aqueous solution containing 2 g. of sodium sulfide and 200 g./l. of sodium chloride. The material is rinsed hot, acidified in a bath containing per liter 5 cc. of acetic acid of 30% strength, rinsed cold, soaped at the boil, rinsed again and dried. There is obtained a green dyeing possessing a very good fastness to wet processing.

Example 10

40 parts of a dyestuff prepared by coupling diazotized 3-amino-benzene - sulfonyl-(methyl-amino)-β-ethyl-thiosulfuric acid with 3-(2',3'-hydroxy-naphthoylamino)-4-methoxy-benzyl-thiosulfuric acid are dissolved in 300 parts of hot water. 500 parts of an alginate thickening (40:1000) are stirred into this solution which is then adjusted to 1000 parts by the addition of 160 parts of water. The printing ink so prepared is printed on cotton fabric. After drying, the print is steamed for 20 minutes at a temperature ranging from about 101° C. to 105° C. in a star steamer. The material is then after-treated for 10 minutes at the boil with a solution of 5 g./l. of sodium sulfide and 200 g./l. of sodium chloride in water. For completing the print the material is rinsed cold and hot, soaped at the boil, rinsed again and dried. In this manner a full red which is fast to washing is obtained.

Example 11

The cotton fabric to be printed is padded with a sodium sulfide solution of 1% strength. After drying, the fabric pretreated in this manner is printed with a printing ink which contains 40 parts of the dyestuff obtainable by coupling 3 moles of diazotized 3-amino-benzene-sulfonyl - (methyl-amino) - β-ethyl-thiosulfuric acid with the coupling component described in Example 3, 460 parts of water and 500 parts of a tragacanth thickening (60:1000). After printing and drying, the material is steamed for 30 minutes in the star steamer at a temperature within the range of 101° C. to 105° C. The material is then rinsed cold and hot, soaped at the boil and dried after final rinsing. There is obtained a clear green which is fast to wet processing.

Example 12

0.2 part of a yellow dyestuff corresponding to the following formula

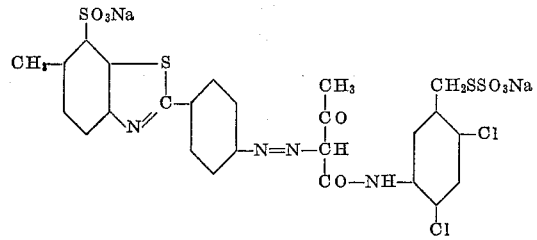

which is obtained by coupling diazotized dehydrothio-toluidine-sulfonic acid with 3-acetoacetylamino-4,6-dichlorobenzyl-thiosulfuric acid, is dissolved in hot water. The dyestuff solution is filled up to obtain 300 parts. 10 parts of cotton are then introduced into this solution. The whole is heated to 60° C., 2 parts of sodium carbonate are added thereto in portions, the dyeing bath is heated within 30 minutes to 95° C. and dyeing is continued for 1 hour at this temperature. The material is rinsed, soaped at the boil, rinsed again and dried. There is obtained a yellow dyeing possessing a good fastness to wet processing.

Example 13

10 parts of cotton are dyed for 1 hour at a temperature within the range of 95° C. to 100° C. in 300 parts of a dyeing bath containing 2.5 parts of sodium carbonate and 0.4 part of a dyestuff corresponding to the following formula

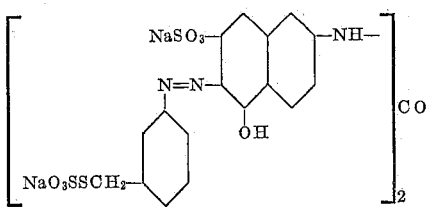

which is prepared by couling 2 moles of diazotized 3-amino-benzyl-thiosulfuric acid with 1 mol of N,N'-bis(5-hydroxy-7-sulfonic acid naphthalene-2)urea. There is obtained a bright orange dyeing possessing a good fastness to wet processing.

*Example 14*

Cotton fabric is padded with an aqueous solution containing, per liter, 50 g. of urea, 100 g. of alginate thickening (40:1000) and 15 g. of the dyestuff prepared by coupling diazotized aniline-3,5 - disulfonic acid with 1-(4'-sulfophenyl)-3 - methyl-5-pyrazolone, converting the dyestuff formed into the trisulfochloride and subsequently condensing it with methyl-amino-β-ethyl-thiosulfuric acid.

The padded fabric is then dried at 80° C. and slop-padded with an aqueous solution containing, per liter, 40 g. of sodium sulfide and 300 g. of sodium chloride.

After a reaction period of 30 seconds at room temperature, the fabric is rinsed, soaped and dried. There is obtained a reddish-yellow dyeing possessing a very good fastness to wet processing.

*Example 15*

30 parts of a dyestuff prepared by coupling 2 moles of diazotized 3-amino-benzene-sulfonyl-(methylamino)-β-ethyl-thiosulfuric acid with 1 mole of 2,5-bis-(acetoacetylamino)-toluene, 50 parts of urea and 100 parts of alginate thickening (40:1000) are dissolved in 1000 parts of water.

Cotton fabric is padded with this solution, dried at 80° C., slop-padded with an aqueous sodium sulfide solution of 1% strength containing, per liter, 250 g. of sodium chloride, and steamed therewith for 45 seconds at 100° C. to 105° C.

The fabric is rinsed, soaped, rinsed again and dried. The dyeing obtained is reddish yellow and possesses a very good fastness to wet processing.

*Example 16*

Cotton fabric is dyed in the manner described in Example 14 with a dyestuff prepared by condensing 1 mole of 1,4-diamino - anthraquinone - bis-(4-tolyl-5-sulfochloride) with 2 moles of β-amino-ethyl-thiosulfuric acid.

There is obtained a grey green dyeing possessing a very good fastness to wet processing.

We claim:
1. A process for dyeing shaped articles of a material selected from the group consisting of natural and regenerated cellulose which comprises applying to said shaped articles a water-soluble organic dyestuff selected from the group consisting of monoazo, disazo, anthraquinone, vat, dioxazine and metal-phthalocyanine dyestuffs containing at least one thiosulfuric acid group linked to a carbon atom of an aromatic nucleus of said dyestuff through a member of the group consisting of —CH$_2$—

—SO$_2$—NH-lower alkylene

—SO$_2$—N-lower alkylene
  |
  lower alkyl and —O-lower alkylene, and an alkaline reducing agent.
2. A process as defined in claim 1 wherein the alkaline reducing agent is applied after the dyestuff.
3. A process as defined in claim 1, wherein the alkaline reducing agent is applied simultaneously with the dyestuff.
4. A process as defined in claim 1 wherein the alkaline reducing agent is applied before the dyestuff.
5. A process as defined in claim 1 wherein the alkaline reducing agent is an alkali sulfide.
6. A process as defined in claim 1 wherein the thiosulfuric acid group-containing dyestuffs contain additional groups imparting solubility in water selected from the group consisting of sulfonic acid and carboxylic acid groups.
7. A process as defined in claim 1 wherein the treatment with an alkaline reducing agent is carred out at room temperature.
8. A process as defined in claim 1 wherein the treatment with an alkaline reducing agent is carried out at a temperature in the range from about 40° C. to about 140° C.
9. A process as defined in claim 1 wherein the dyestuff used contains only two thiosulfuric acid groups as groups imparting solubility in water.

References Cited in the file of this patent
UNITED STATES PATENTS

| | | |
|---|---|---|
| 2,180,805 | Felix et al. | Nov. 21, 1939 |
| 2,245,971 | Felix et al. | June 17, 1941 |
| 2,670,265 | Heyn et al. | Feb. 23, 1954 |
| 2,895,785 | Alsberg et al. | July 21, 1959 |
| 2,914,531 | Staeuble et al. | Nov. 24, 1959 |
| 2,926,985 | Petitcolas et al. | Mar. 1, 1960 |